United States Patent [19]

Sakurahara et al.

[11] Patent Number: 4,756,241
[45] Date of Patent: Jul. 12, 1988

[54] PISTON FOR INTERNAL COMBUSTION ENGINE

[75] Inventors: Kazuo Sakurahara, Saitama; Toyomi Shiba, Tokyo, both of Japan

[73] Assignee: Honda Giken Kogyo Kabushiki Kaisha, Tokyo, Japan

[21] Appl. No.: 781,771

[22] Filed: Sep. 30, 1985

[51] Int. Cl.$^4$ ............................................. F16J 1/04
[52] U.S. Cl. ................................... 92/233; 123/193 P
[58] Field of Search ...................... 92/233; 123/193 P

[56] References Cited

U.S. PATENT DOCUMENTS

| | | | |
|---|---|---|---|
| 2,046,789 | 7/1936 | Norton | 92/233 |
| 2,149,862 | 3/1939 | Nelson | 92/233 X |
| 2,217,542 | 10/1940 | Flammang et al. | 92/233 |
| 2,262,132 | 11/1941 | Berry | 92/233 X |
| 2,309,555 | 1/1943 | Venner et al. | 92/233 |
| 2,497,380 | 2/1950 | Venner et al. | 92/233 |
| 2,513,814 | 7/1950 | Moore | 92/233 |

Primary Examiner—Edward K. Look
Attorney, Agent, or Firm—Lyon & Lyon

[57] ABSTRACT

A piston for an internal combustion engine in which the skirt portion of the piston is slightly oval rather than cylindrical and the size of the oval is varied along the skirt to produce contact surfaces of a particular shape engaging the cylinder. Specifically, the smallest diameter of the oval continuously increases from the piston rings downwardly and the largest diameter increases for a portion thereof. The contact surface shape has sloping sides to enhance the flow of lubricating oil away from the rings.

10 Claims, 2 Drawing Sheets

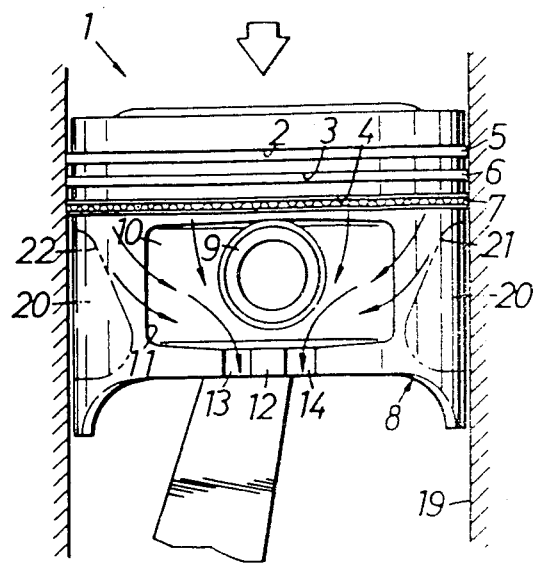
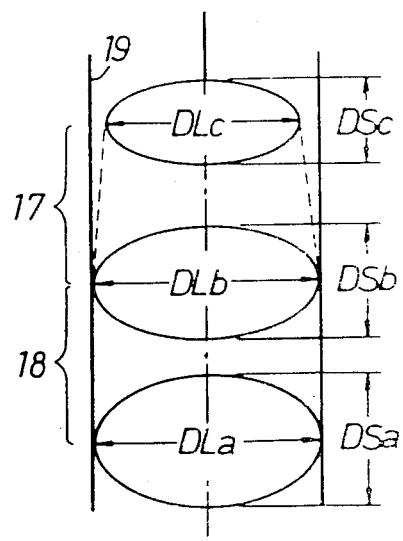

PISTON FOR INTERNAL COMBUSTION ENGINE

The present invention relates to a piston for an internal combustion engine and, in particular, to the shape of the skirt part of the piston below the piston rings.

In a conventional piston of the type having a slightly oval, rather than perfectly cylindrical, skirt portion, the largest diameter of the skirt is progressively changed in the axial direction of the piston, whereas the smallest diameter remains unchanged. As shown in FIG. 5, a conventional piston 1' contacts the cylinder inner surface through a contact surface 20' of approximately the size and shape shown by the chain line. This contact surface 20' has a configuration which inhibits the downward flow of lubricating oil scraped from the cylinder wall by an oil scraping piston ring fitted in a lowermost piston ring fitting groove 4. As a result, the lubricating oil does not readily and smoothly return to the crankcase whereby some may squeeze past the piston rings and unfavorably enter the combustion chamber which in turn results in an undesirable increase in consumption of the lubricating oil.

In view of such circumstances, it is a primary object of the present invention to provide a piston of a particular shape which allows the lubricating oil to readily and smoothly return to the crankcase of an internal combustion engine. A more specific object of the present invention is to provide a piston with a skirt portion which is gradually reduced in both its largest and smallest diameters in the direction toward the lowermost piston ring fitting groove.

The present invention will be described in connection with a single preferred embodiment as shown in the drawings wherein:

FIG. 3 is a front elevation view similar to FIG. 1 and illustrating the piston in a cylinder.

FIG. 4 is a diagrammatic view showing the piston diameters in greatly exaggerated portions for clarity of illustration.

Figure 1:
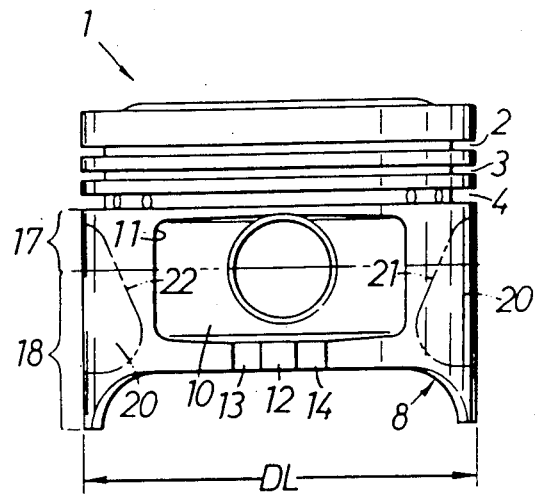
FIG. 1 is a front elevation view of the piston of this invention.
Figure 2:
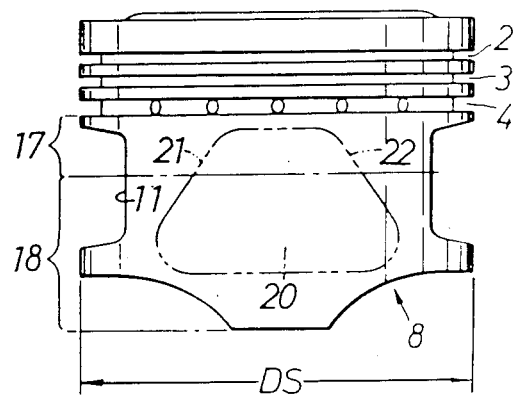
FIG. 2 is a side elevation view of the piston of FIG. 1.

Referring first to FIGS. 1, 2 and 3, a piston 1 is provided at its upper portion with three piston ring fitting grooves 2, 3 and 4 spaced from each other in the axial direction of the piston 1 and extending around the entire circumference thereof. Sealing piston rings 5 and 6 are respectively fitted in the upper two piston ring fitting grooves 2 and 3, while an oil scraping piston ring 7 is fitted in the lowermost piston ring fitting groove 4.

The piston 1 is provided with a skirt portion 8 below the lowermost piston ring fitting groove 4. This skirt portion 8 is not perfectly cylindrical but rather it has the cross-sectional configuration of an oval which has its smallest diameter DS extending in axial direction of the piston pin 9 and its largest diameter DL extending in the direction perpendicular to that pin axial direction.

A Pin boss 10 for supporting the piston pin 9 is provided on the outer face of the piston on both sides and has a rectangular recess 11. A pair of guide grooves 13 and 14 are provided in each pin boss 10 such as to extend between the lower edge of the rectangular recess 11 and the lower end of the skirt portion 8 while interposing a land 12 therebetween.

Referring now to FIG. 4, the skirt portion 8 is comprised of first and second oval portions 17 and 18. The upper or first oval portion 17 extends between approximately the axis of the piston pin 9 and the lowermost piston ring fitting groove 4, while the lower or second oval portion 18 consists of the remaining portion of the skirt portion 8.

In the first oval portion 17, both its largest and smallest diameters DL and DS are gradually reduced in the upward direction from the location of pin 9 toward the lowermost piston ring fitting groove 4. In the second oval portion 18, its smallest diameter DS is gradually reduced from the lower end toward the first oval portion 17, whereas its largest diameter DL remains unchanged. More specifically, as shown in FIG. 4, assuming now that the largest and smallest diameters of the first oval portion 17 at its upper end are respectively represented by DLc and DSc, while the largest and smallest diameters of the skirt portion 8 at the boundary between the first and second oval portions 17 and 18 (i.e. the level of pin 9) are respectively represented by DLb and DSb, and the largest and smallest diameters of the second oval portion 18 at its lower end are respectively represented by DLa and DSa, the above-described diameters assume relationships therebetween as those respectively stated by the following formulae (1) and (2):

$$DLa = DLb > DLc \qquad (1)$$

$$DSa > Dsb > DSc \qquad (2)$$

Such first and second oval portions 17 and 18 are integrated with each other in such a manner that the boundary portion therebetween has a smooth surface, whereby the skirt portion 8 is formed. It is to be noted that FIG. 4 shows the difference between the corresponding dimensions in an enlarged scale for the sake of convenience of illustration whereas the difference is actually very small.

As a result of these relationships among the diameters DL and DS, the piston 1 has contact areas or surfaces 20 formed on the outer surface of the skirt portion 8 of the general shape shown within the chain lines in FIGS. 1-3 through which the skirt portion 8 contacts the inner surface of a cylinder 19. More specifically, by forming the skirt portion 8 in such a manner that both the above-described formulae (1) and (2) are satisfied, the contact surface 20 has a configuration whereby it is gradually reduced in its width in the direction toward the upper end thereof, with boundary lines 21 and 22 thereby being formed which slant in such a manner that they come closer to each other toward the upper end of the contact surface 20.

Figure 5:
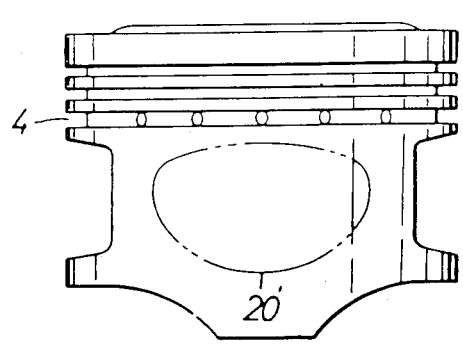
FIG. 5 is an elevation view similar to FIG. 2 of one typical conventional piston.

The following is a description of the operation of this embodiment. As the piston 1 reciprocates within the cylinder 19, the lubricating oil is supplied in a conventional manner from the large end portion of the connecting rod such as to effect lubrication between the piston 1 and the cylinder 19. This lubricating oil is scraped off by means of the lowermost piston ring 7. At this time, the scraped lubricating oil is guided toward the rectangular recess 11 along the boundary lines 21 and 22 of each of the contact surfaces 20 in the manner shown by the arrows in FIG. 3 and is then returned to the crankcase from the rectangular recess 11 through the guide grooves 13 and 14. Accordingly, it is possible to prevent intrusion of the lubricating oil into the combination chamber as much as possible. In contrast, with the conventional shaped piston shown in FIG. 5, the lubricating oil tends to become trapped between the nearly flat upper extremity of the contact surface 20' and the lowermost piston ring and to then bypass the rings.

Further, the contact surface 20 of the piston of this invention has a relatively large width at its lower portion and therefore allows the skirt portion 8 to slidably contact the cylinder 19 over a relatively wide area at the lower portion of the skirt portion 8 for increased stability but which is subjected to a relatively low degree of heat load. For this reason, generation of piston slap noise is reduced as much as possible.

As has been described above, according to the present invention, the piston skirt is provided with a portion which is gradually reduced in both its largest and smallest diameters toward the piston ring fitting groove. It is therefore possible to allow each of the contact surfaces of the skirt through which it contacts the cylinder to have a configuration that is gradually reduced in its width in the upward direction toward the piston ring fitting groove. Thus, it is possible for the lubricating oil which is being scraped off the cylinder wall to be guided toward the end portions of the piston pin and thereby smoothly returned to the crankcase. Accordingly, it is advantageously possible to reduce the consumption of lubricating oil.

The invention claimed is:

1. In an improved internal combustion engine piston having a ring groove portion above a skirt portion, the improvement comprising the skirt portion having an oval cross-section with a largest diameter in a first direction, the smallest diameter in the second direction substantially perpendicular to said first direction, said largest diameter of said oval cross-section increases in the downward direction from an uppermost extremity near the ring groove portion for only a portion of said skirt portion, and said smallest diameter decreasing substantially throughout the skirt portion from a lowermost extremity to an uppermost extremity near the ring groove portion of the piston.

2. The piston for a cylinder of an internal combustion engine, comprising, the ring groove portion and a skirt portion, said skirt portion having an outer surface of the size and shape forming two diametrically located contact areas for slideably engaging the cylinder, and each said contact area having sloping sides inclined toward each other toward the ring groove portion and forming a relatively narrow upper end of contact area for enhancing lubricating oil flow downwardly from the ring groove portion between the cylinder and the skirt portion, and wherein said skirt portion includes diametrically located recess areas of the axis of the pin for receiving the lubricating oil flowing downwardly, and groove means in the lowermost portion of said recess for allowing downward flow of lubricating oil.

3. The piston of claim 2 wherein said two contact areas are located perpendicular to an axis of a pin for connecting the piston to a rod in the engine.

4. A piston for an internal combustion engine, comprising: a skirt portion and a ring groove portion, said skirt portion having an outer surface having a non-cylindrical oval cross-section, a first portion of said outer surface having the oval cross-section reducing in size in all directions toward the ring groove portion of the piston; a second potion of the outer surface below said first portion of said outer surface having a smallest diameter of the oval cross-section which reduces in diameter in the direction of said first portion; and the said second portion has a largest diameter of the oval cross-section which remains substantially constant.

5. The piston of claim 4 wherein said first portion of said outer surface terminates at an upper end adjacent the ring groove portion of the piston.

6. The piston of claim 4 wherein the said first and second portions join at approximately the level of a pin connecting the piston to a connecting rod of the engine.

7. A piston for an internal combustion engine, comprising: A skirt portion and a ring groove portion, said skirt portion having an outer surface with a non-cylindrical oval cross-section, a first portion of said outer surface having the oval cross-section reducing in size in all directions toward the ring groove portion; a second portion of the outer surface below said first portion of said outer surface has a smallest diameter of the oval cross-section which reduces in diameter in the direction of said first portion and there is a smooth surface and transition between said first and second surfaces.

8. The piston of claim 7 wherein said outer surface of said first portion includes diametrically located contact areas for slidably engaging a cylinder wall, and said contact areas have absolutely sloping sides inclined toward each other in the direction of the ring groove portion throughout the first portion of the skirt portion.

9. The piston of claim 7 wherein the said first and second pistons join at approximately the level of a pin connecting the piston to a connecting rod of the engine.

10. The piston of claim 7 wherein said first portion of said outer surface terminates in an upper end adjacent the ring groove portion of the piston.

* * * * *